United States Patent Office 3,681,036
Patented Aug. 1, 1972

3,681,036
METHOD OF MAKING SILICON HALIDES
Rudolf Schwarz, Wasserlos, and Eugen Meyer-Simon, Frankfurt am Main, Germany, assignors to Deutsche Gold- und Silber-Scheideanstalt vormals Roessler, Frankfurt am Main, Germany
Filed Aug. 18, 1970, Ser. No. 64,707
Claims priority, application Germany, Aug. 20, 1969, P 19 42 280.1
Int. Cl. C01b *33/08, 33/02*
U.S. Cl. 23—366
10 Claims

ABSTRACT OF THE DISCLOSURE

Silicon halides are formed in a continuous process by reacting silicon or a silicon-containing compound with hydrogen halide at a temperature between 350 and 1200° C. The silicon halide is then recovered and the hydrogen formed in the reaction is recycled in an amount to provide a ratio of partial pressures in the reaction mixture between hydrogen halide and hydrogen in the range between 1:1 and 1:50 at a predetermined reaction temperature within the stated range.

BACKGROUND OF THE INVENTION

The invention relates to a process of making silicon halides, particularly silicochloroform.

Silicochloroform, $HSiCl_3$, is of increasing importance among the silicon halides ($H_nSiX_{4-n}$) as raw material for pyrogenically produced silicic acid (fume silica), for organosilane synthesis, and for making silicon of extremely high purity for semiconductor purposes.

Processes heretofore known for making silicochloroform are based on the hydrochlorination of silicon and are characterized by the use of different catalytic additives employed in order to control the reaction kinetics. Normally silicon tetrachloride and hydrogen are formed in the reaction. However, the yield of silicochloroform is small.

The German published application 1,105,398 describes a process wherein the yield of silicochloroform can be increased by employing a cooling device in the reactor in order to reduce the reaction temperature.

If the hydrochlorination is to be practiced on an industrial scale it is necessary to obtain a sufficiently high total performance. This requirement can usually be met only by increasing the reaction temperature above the temperature level at which a good yield of the specific desired final product can be obtained.

SUMMARY OF THE INVENTION

The present invention resides in the finding that within the temperature range of about 350 and 1200° C. which has heretofore been used for the hydrohalogenation of silicon, uniformly high yields of silicochloroform can be obtained if, at least part of the formed silicon halide is removed from the reaction mass and the residue, if any, is recycled together with the formed hydrogen and the amount of hydrogen is adjusted to provide a ratio of partial pressures of hydrogen halide/hydrogen between 1:1 and 1:50 at a predetermined reaction temperature within the stated range.

DETAILED DESCRIPTION OF THE INVENTION AND OF PREFERRED EMBODIMENTS

Figure 1:
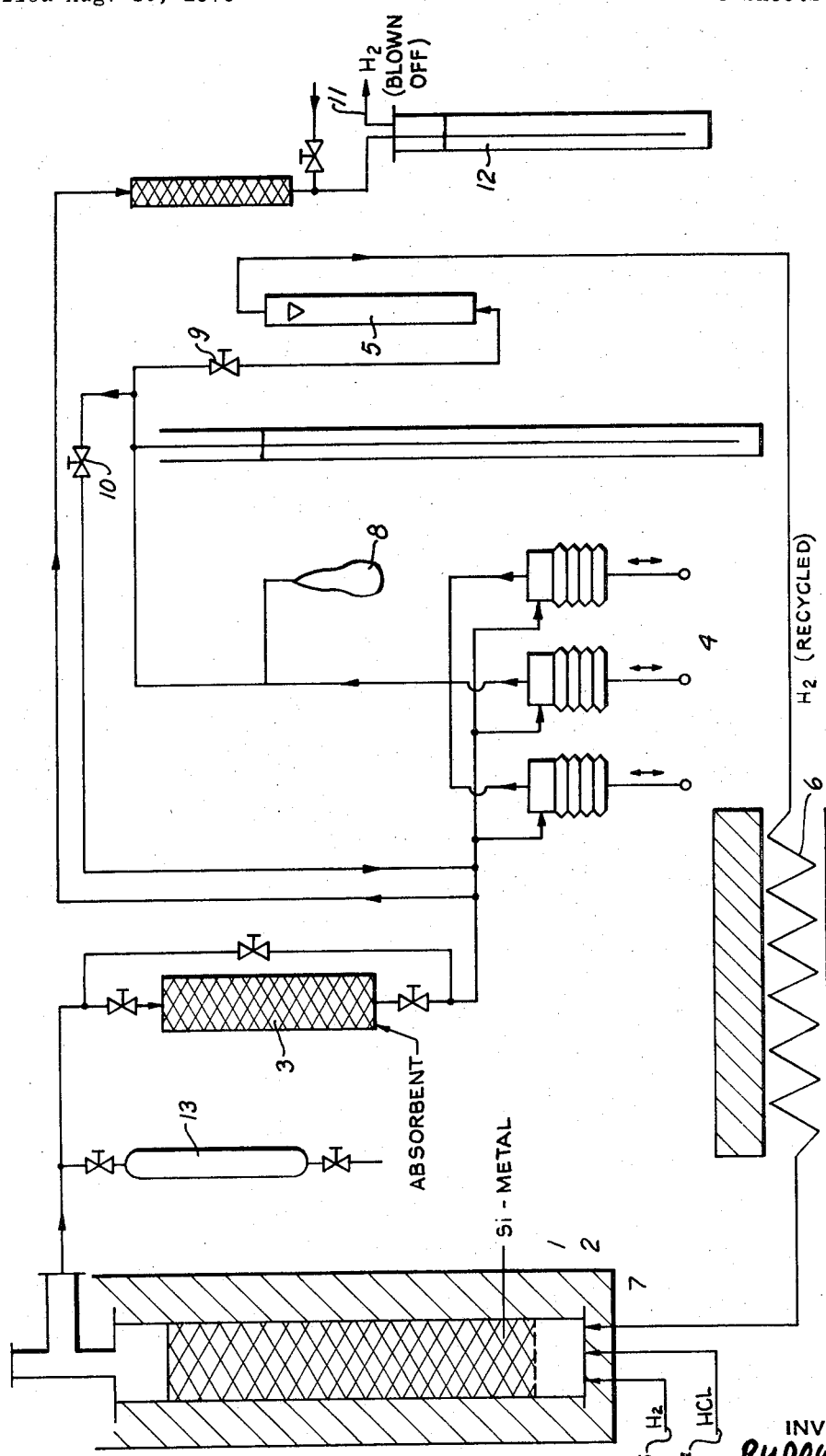
FIG. 1 shows in diagrammatic form an apparatus for performing the reaction of the invention together with a flow sheet thereof.

If elemental hydrogen is available in sufficient amounts, the partial pressure ratio of the invention may be obtained also by simply introducing hydrogen from an extraneous source into the circulating hydrohalogenizing agent. The preferred manner of carrying out the concept of the invention, however, contemplates making use of the hydrogen produced in the hydrohalogenation and recycling such hydrogen to the extent necessary to establish the required partial pressure relation in the reaction system.

The starting material may be reacted, for instance, in a stationary bed or in a fluidized bed. Preferably, ferrosilicon is used having a content of silicon in excess of 90% by weight. However, it is also possible to use alloys of silicon with metals, for instance with manganese or to use silicides such as magnesium silicide or calcium silicide. It is furthermore possible to use a silicon material which has been subjected to a surface coating in conventional manner with activating metals, metal compounds or non-metal compounds such as copper, silver nitrate, iron chloride, etc.

Particularly high yields of silicochloroform, that is yields in excess of 90%, can be obtained according to an embodiment of the invention by carrying out the reaction at temperatures in the range between 400 and 800° C. and adjusting the hydrogen halide/hydrogen partial pressure ratio within the range between 1:5 and 1:40, depending on the chosen reaction temperature within the just-stated preferred temperature range of temperature.

The complete or partial separation of the silicon halide which is formed in the reaction is effected prior to recycling the hydrogen and may be carried out by adsorption and subsequent desorption in a solvent which is inert towards chlorosilane and preferably is effected by low temperature cooling to temperatures below 10° C.

The cooling traps used for the separation in this process must be subjected to proportionately lower temperatures when the amounts of recycled hydrogen are larger.

To recycle the hydrogen and, if desired, some residual chlorosilane, it is preferred to use bellows pumps made of "Teflon" which have an adjustable stroke. However, other gas supply devices of conventional nature can also be used.

According to a particularly preferred embodiment, the silicon halide to be separated is adsorbed on activated carbon (for instance "Supersorbon WS IV" of the Degussa Company). In this manner it is possible to obtain a virtually complete separation of the chlorosilanes even from mixtures that consist predominantly of hydrogen. The separation can fairly well be carried out at normal temperature. However, even better results can be obtained according to an embodiment of the invention by subjecting the adsorbent to cooling. Depending on the desired degree of separation, temperatures are used which are below 20° C.

With reference to the drawings, it will be seen that the hydrochlorination of the silicon is carried out in an electrically heated quartz reactor 1 of a length of 100 cm. and a diameter of 10 cm. Within the reactor there is provided a bed of mica 2. The mass provided in the reactor consists of 7 kg. silicon particles of hazel nut size with the silicon content in excess of 90%. Hydrogen chloride is passed into the reactor through an inlet 14. After completion of the reaction the mass is passed into an adsorption tower 3 containing active carbon "Supersorbon WS IV," of the Degussa Company. By means of the adsorbent the complete or partial separation of the silicon chloride fraction from the reaction gas is effected. The charge of activated carbon is renewed whenever the adsorption zone advances up to about the middle of the adsorption tower. This zone has a width of a few centimeters and, without cooling, reaches a temperature up to 100° C.

The hydrogen which is practically free of chlorosilane is received in three Teflon bellows pumps 4 of the E Haage Company of Muehlheim/Ruhr, Germany. The pumps are arranged in parallel and have a maximum performance of 2 m.³/h. The hydrogen is measured with a rotameter 5 and after reheating in an electrically heated coil 6 is recycled into the reaction mixture where it is mixed with fresh hydrogen chloride in a premixing chamber 7.

The pulsating of the bellows membrane pumps is controlled by a rubber bulb 8 arranged between the pumps and a valve 9.

If the hydrogen which is supplied by the pumps at a constant stroke is not required in the reactors it flows back into the pump inlet through a valve 10. Hydrogen formed in the hydrochlorination reaction and not retained in the reaction system is blown off through an exhaust 11 which is provided with an interposed liquid interceptor 12. By adjusting the depth of immersion of the riser in the liquid of the interceptor device, the desired hydrogen pressure can be adjusted in the reaction temperature and the production of air can thus be prevented.

Prior to commencing the reaction the entire apparatus is flushed for several hours with hydrogen introduced through inlet 15 while the pumps are in operation.

As soon as it is determined that the reactor has reached temperature equilibrium and that the molar relation of $HCl:H_2$ has the desired value, specimens of the gas mixture are removed for gas chromatographic analysis. This is done by means of an evacuated gas vessel 13 which is arranged immediately following the reactor.

The following examples will further illustrate the invention:

EXAMPLE 1

This example illustrates the recycling exclusively of hydrogen while completely separating the formed chlorosilane.

The apparatus employed consisted of the following parts:

quartz reactor of a length of 1000 mm. and a diameter of 100 mm.
stationary bed of FeSi of a height of 760 mm. size of FeSi particles—15–25 mm.
vacant volume within the total stationary bed of FeSi about 3.3 liters.

Figure 2:
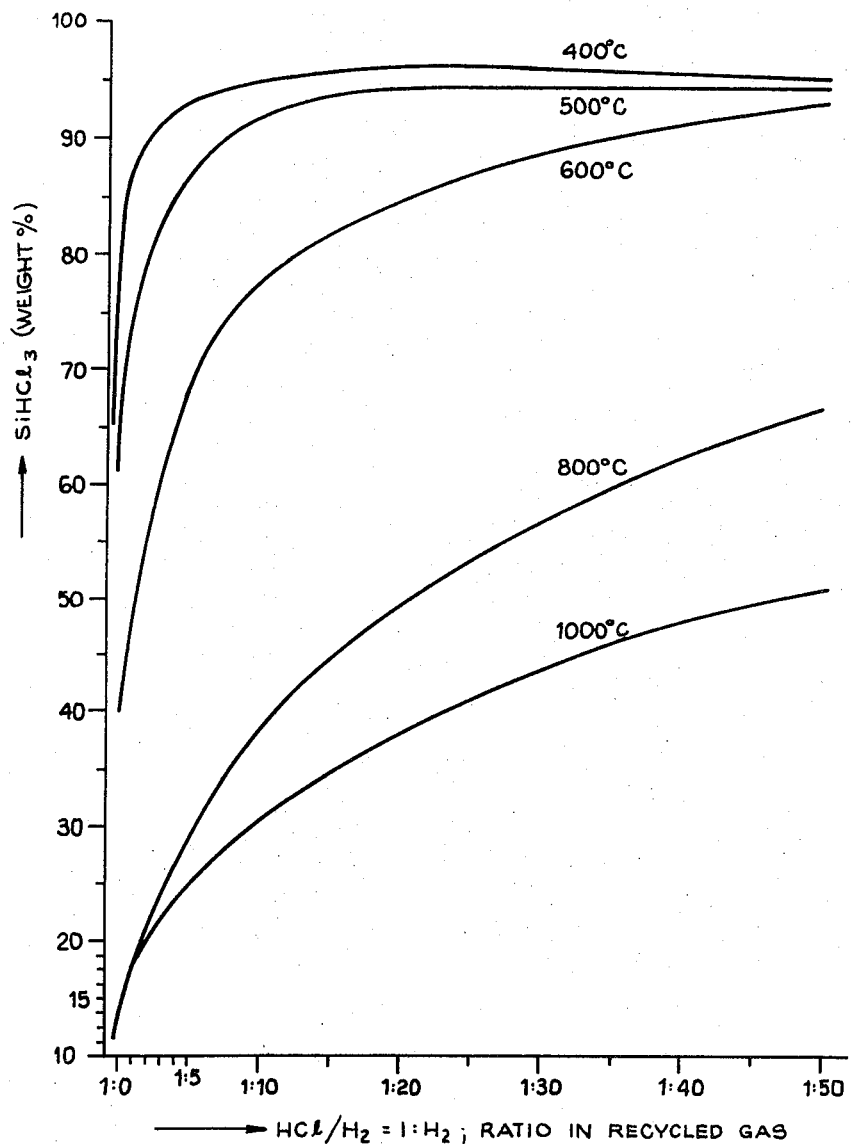
FIG. 2 is a graph showing the amounts of $SiHCl_3$ present in the product made by the process of the invention. The reaction product is constituted by the mixture $SiCl_4/SiHCl_3/SiH_2Cl_2$. The amount of $SiHCl_3$ is shown in relation to varying pressure ratios of $HCl/H_2$ in the recycled gas (isothermal representation with indication of specific temperatures).
Figure 3:
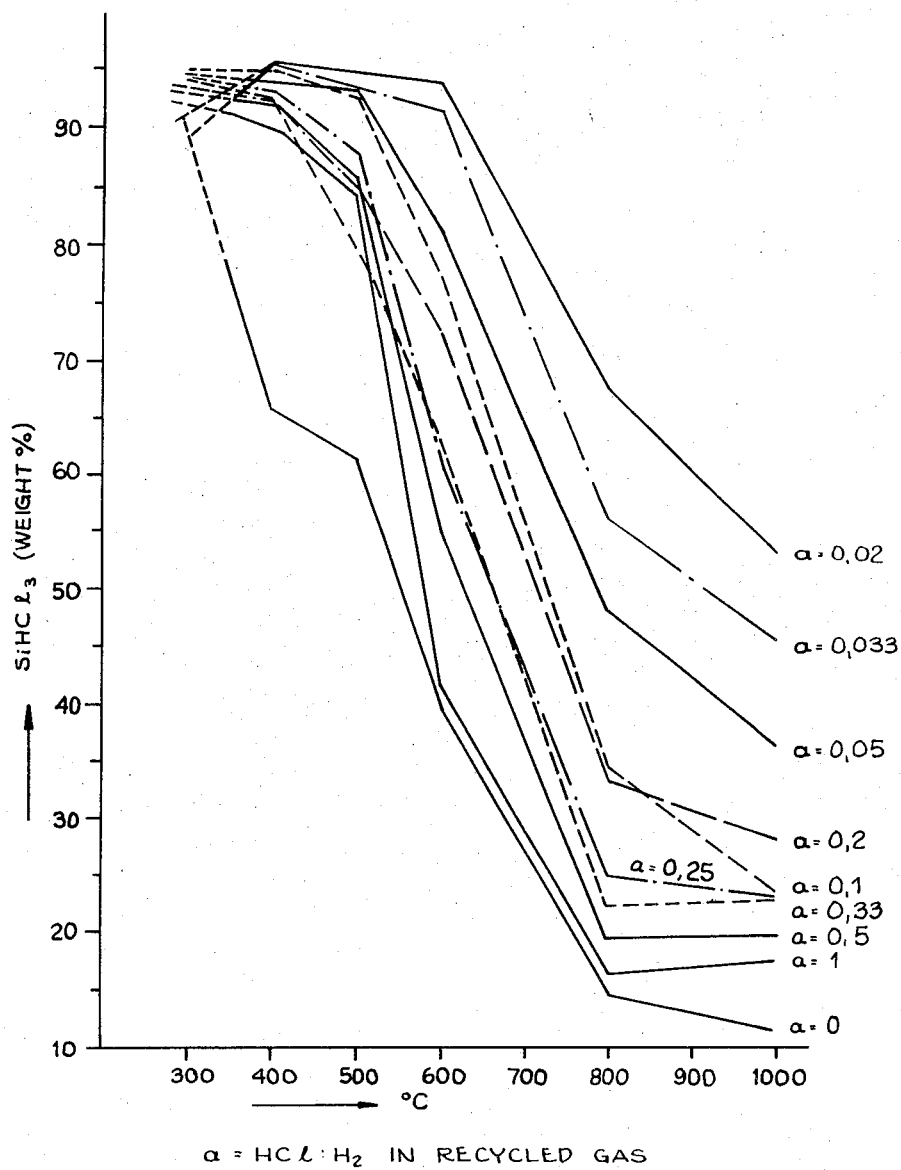
FIG. 3 is a similar graph but showing amount of $SiHCl_3$ in relation to varying temperatures (isobaric representation with indication of specific pressure ratios).

A ferrosilicon with 90% silicon content was reacted. The following table shows the composition of the reaction gases which was determined by gas chromatographic analysis. It also shows the variation in composition depending on temperature and $HCl:H_2$ mole ratio. FIGS. 2 and 3 also represent the results obtained.

The values appearing in the table and their graphical representation shows, for instance, the following:

At 1000° C. there are obtained 11% $HClSi_3$ without recycling of hydrogen. This $HSiCl_3$ fraction could be increased at the same temperature to 53% if the amount of recycled hydrogen was increased at a ratio of $HCl/H_2$ between 1 and 50.

At 800° C. a similar result was obtained. The yield of $HSiCl_3$, however, was substantially higher, that is, was 67% at a recycling ratio of 1:50.

At 600° C. there were obtained about 40% $HSiCl_3$ even without any recycling of $H_2$. With increasing recycling of $H_2$ the $HSiCl_3$ fraction first increased at a steep ratio and then (from about 1:20) at a slow ratio. At a recycling ratio of 1:30, the $HSiCl_3$ fraction was above 90%.

At 500° C. a ratio of the recycling gas of 1:10 was enough to increase the $HSiCl_3$ fraction in the reaction mixture to above 90%. A further increase of the ratios in the recycling gas, even up to 1:50, hardly amounted to any further gain in $HSiCl_3$.

At 400° C. 65% $HSiCl_3$ could be established in the reaction product without recycling any hydrogen. A recycling ratio of 1:1 was sufficient to increase the amount

| Text | HCl, l./h. | H₂, l./h. | Temp., °C. | Mole ratio, HCl:H₂ | SiCl₄ | SiHCl₃ | SiH₂Cl₂ |
|---|---|---|---|---|---|---|---|
| 1 | 50 | — | 400 | 1:0 | 33.7 | 65.6 | 0.49 |
| 2 | 50 | 50 | 400 | 1:1 | 9.25 | 90.0 | 0.788 |
| 3 | 50 | 100 | 400 | 1:2 | 7.38 | 92.0 | 0.591 |
| 4 | 50 | 150 | 400 | 1:3 | 6.38 | 92.7 | 1.0 |
| 5 | 50 | 200 | 400 | 1:4 | 6.15 | 93.0 | 1.0 |
| 6 | 50 | 250 | 400 | 1:5 | 7.4 | 92.0 | 0.92 |
| 7 | 50 | 500 | 400 | 1:10 | 5.02 | 94.9 | 0.96 |
| 8 | 50 | 1,000 | 400 | 1:20 | 5.65 | 93.7 | 0.64 |
| 9 | 50 | 1,500 | 400 | 1:30 | 4.05 | 95.3 | 0.64 |
| 10 | 50 | 2,500 | 400 | 1:50 | 3.56 | 95.0 | 1.4 |
| 1 | 50 | — | 500 | 1:0 | 38.2 | 61.5 | 0.294 |
| 2 | 50 | 50 | 500 | 1:1 | 15.4 | 84.0 | 0.564 |
| 3 | 50 | 100 | 500 | 1:2 | 13.95 | 85.3 | 0.775 |
| 4 | 50 | 150 | 500 | 1:3 | 16.05 | 82.9 | 1.04 |
| 5 | 50 | 200 | 500 | 1:4 | 11.57 | 87.7 | 0.84 |
| 6 | 50 | 250 | 500 | 1:5 | 15.02 | 84.0 | 1.04 |
| 7 | 50 | 500 | 500 | 1:10 | 7.4 | 92.0 | 0.79 |
| 8 | 50 | 1,000 | 500 | 1:20 | 5.86 | 93.0 | 1.07 |
| 9 | 50 | 1,500 | 500 | 1:30 | 5.85 | 93.0 | 1.27 |
| 10 | 50 | 2,500 | 500 | 1:50 | 3.22 | 94.8 | 1.93 |
| 1 | 50 | — | 600 | 1:0 | 59.7 | 40.0 | 0.39 |
| 2 | 50 | 50 | 600 | 1:1 | 58.4 | 41.3 | 0.194 |
| 3 | 50 | 100 | 600 | 1:2 | 43.9 | 55.5 | 0.49 |
| 4 | 50 | 150 | 600 | 1:3 | 35.4 | 63.6 | 0.98 |
| 5 | 50 | 200 | 600 | 1:4 | 36.7 | 62.1 | 1.08 |
| 6 | 50 | 250 | 600 | 1:5 | 26.6 | 72.2 | 1.2 |
| 7 | 50 | 500 | 600 | 1:10 | 22.1 | 76.6 | 1.32 |
| 8 | 50 | 1,000 | 600 | 1:20 | 17.0 | 81.4 | 1.55 |
| 9 | 50 | 1,500 | 600 | 1:30 | 7.43 | 91.5 | 1.06 |
| 10 | 50 | 2,500 | 600 | 1:50 | 4.62 | 93.8 | 1.61 |
| 1 | 50 | — | 800 | 1:0 | 85.7 | 14.2 | 0.1 |
| 2 | 50 | 50 | 800 | 1:1 | 84.0 | 15.9 | 0.22 |
| 3 | 50 | 100 | 800 | 1:2 | 80.2 | 19.5 | 0.25 |
| 4 | 50 | 150 | 800 | 1:3 | 77.8 | 21.9 | 0.298 |
| 5 | 50 | 200 | 800 | 1:4 | 75.2 | 24.4 | 0.39 |
| 6 | 50 | 250 | 800 | 1:5 | 66.2 | 33.2 | 0.68 |
| 7 | 50 | 500 | 800 | 1:10 | 64.6 | 34.7 | 0.78 |
| 8 | 50 | 1,000 | 800 | 1:20 | 50.0 | 48.0 | 1.94 |
| 9 | 50 | 1,500 | 800 | 1:30 | 41.1 | 55.7 | 3.13 |
| 10 | 50 | 2,500 | 800 | 1:50 | 29.2 | 67.3 | 3.49 |
| 1 | 50 | — | 1,000 | 1:0 | 88.5 | 11.5 | 0.06 |
| 2 | 50 | 50 | 1,000 | 1:1 | 82.2 | 17.55 | 0.25 |
| 3 | 50 | 100 | 1,000 | 1:2 | 79.8 | 19.7 | 0.418 |
| 4 | 50 | 150 | 1,000 | 1:3 | 76.6 | 22.9 | 0.425 |
| 5 | 50 | 200 | 1,000 | 1:4 | 76.4 | 23.0 | 0.495 |
| 6 | 50 | 250 | 1,000 | 1:5 | 71.7 | 27.9 | 0.49 |
| 7 | 50 | 500 | 1,000 | 1:10 | 75.4 | 23.1 | 1.47 |
| 8 | 50 | 1,000 | 1,000 | 1:20 | 63.3 | 35.8 | 0.97 |
| 9 | 50 | 1,500 | 1,000 | 1:30 | 52.8 | 45.2 | 1.94 |
| 10 | 50 | 2,500 | 1,000 | 1:50 | 44.0 | 53.0 | 2.92 | of $HSiCl_3$ to above 90%. By increasing the recycling ratio to 1:10, a further increase could be achieved to an amount above 95%.

According to these results, it is possible to form silicochloroform with only a small fraction of silicon tetrachloride present of which the separation may not even be necessary. This can be attained within a temperature range of 400° C. to 1000° C. and a partial pressure ratio of $HCl:H_2$ between 1:1 and 1:50. In summary, it can be said that more than 90% $HSiCl_3$ can be obtained if the partial pressure ratio of $HCl:H_2$ is at 600° C. 1:30, or
at 500° C. 1:10, or
at 400° C. 1:1.

The amounts of dichlorosilane ($H_2SiCl_2$) which are obtained as a by-product are small and are within the order of about 1% by weight. However, if desired, by increasing the amount of recycled $H_2$ to a particularly high level and maintaining extremely low reaction temperatures, the yield of $H_2SiCl_2$ can be increased substantially.

EXAMPLE 2

This example illustrates a process wherein hydrogen is recycled and an incomplete or partial separation of the formed chlorosilane is effected.

The apparatus employed was the same as in Example 1. The temperature of the silicon bed was 600° C. The input was 50 liters of HCl per hours. In order to effect the separation the reaction gases were passed through cooling traps which were at a temperature of −20° C. Thus the major part of the chlorosilanes condensed. The residual gas still contained about 10 vol.-percent of chlorosilane, mainly $SiHCl_3$ in addition to hydrogen. The hydrogen containing the small amount of chlorosilane was then passed to the Teflon bellows pumps and therefrom to the reactor. The amount of recycled gas mixture was 550 l. per hour. This corresponded to 500 l./h. of pure hydrogen. The $HCl/H_2$ partial pressure ratio at the inlet to the reactor was therefore 1:10. The chlorosilane mixture which condensed in the cooling traps consisted of 22.5% $SiCl_4$, 76% $SiHCl_3$, and 1.5% $SiH_2Cl_2$.

It was unexpected that by the process of the invention silicochloroform could be obtained at temperatures where also a high yield was possible, the yield being above 90% relative to the initial input of hydrogen chloride.

We claim:

1. A continuous process of making chlorosilanes comprising the steps of reacting silicon or a ferrosilicon with hydrogen chloride at a temperature between 350 and 1200° C.; separating and recovering at least part of the formed chlorosilanes from the gaseous reaction mixture; and recycling hydrogen into the reaction mixture together with any chlorosilane not separated and recovered in the foregoing step, the amount of hydrogen present in the reaction mixture being adjusted by varying the amount of recycled hydrogen so as to provide a ratio of partial pressures of hydrogen chloride to hydrogen between 1:1 and 1:50 at a specific predetermined reaction temperature within the stated range.

2. The continuous process of claim 1, wherein the chlorosilane produced is silicon chloroform and the amount of added hydrogen is increased for reaction at increasing temperatures.

3. The process of claim 1, wherein all of the recycled hydrogen is obtained from the initial reaction between silicon and hydrogen chloride.

4. The process of claim 1, wherein the reaction is effected at temperatures between 400 and 800° C. and the amount of hydrogen is adjusted to provide a ratio of partial pressures of hydrogen chloride/hydrogen between 1:5 and 1:40.

5. The process of claim 1, wherein the ferrosilicon has a content of silicon in excess of 90% by weight.

6. The process of claim 1, wherein the separation of the chlorosilanes is effected by means of low-temperature cooling.

7. The process of claim 6, wherein the low temperature cooling takes place below a temperature of below 10° C.

8. The process of claim 1, wherein the separation of the chlorosilanes is effected by adsorption on activated carbon.

9. The process of claim 8, wherein the activated carbon is subjected to precooling.

10. The process of claim 9, wherein the activated carbon is cooled to a temperature below 20° C.

References Cited

UNITED STATES PATENTS

| | | | |
|---|---|---|---|
| 2,798,792 | 7/1957 | Stelling et al. | 23—205 X |
| 3,148,035 | 9/1964 | Enk et al. | 23—205 X |
| 3,020,128 | 2/1962 | Adcock et al. | 23—205 X |
| 2,832,669 | 4/1958 | Allen | 23—205 X |

OSCAR R. VERTIZ, Primary Examiner

G. ALVARO, Assistant Examiner

U.S. Cl. X.R.

23—205, 223.5